United States Patent
Kim et al.

(10) Patent No.: US 6,555,263 B1
(45) Date of Patent: Apr. 29, 2003

(54) SEALED BATTERY WITH INTERNAL PRESSURE ACTIVATED SAFETY MECHANISM

(75) Inventors: Hyun-Joong Kim, Chungchongnam-do (KR); In-Han Kim, Kyonggi-do (KR); Ky-Hoon Ahn, Seoul (KR)

(73) Assignee: Samsung SDI Co., LTD, Kyonggi-do (KR)

( * ) Notice: Subject to any disclaimer, the term of this patent is extended or adjusted under 35 U.S.C. 154(b) by 105 days.

(21) Appl. No.: 09/605,135

(22) Filed: Jun. 27, 2000

(30) Foreign Application Priority Data

Feb. 16, 2000 (KR) .......................................... 2000-7348
Feb. 16, 2000 (KR) .......................................... 2000-7349

(51) Int. Cl.$^7$ ............................................... H01M 2/00
(52) U.S. Cl. ............................ 429/61; 429/53; 429/57; 429/62; 429/82
(58) Field of Search ............................. 429/53, 57, 61, 429/62, 82

(56) References Cited

U.S. PATENT DOCUMENTS

| 5,705,290 | A | 1/1998 | Azema |
| 6,284,403 | B1 * | 9/2001 | Tsurutani et al. ........... 429/116 |
| 6,322,921 | B1 * | 11/2001 | Iwaizono et al. ............. 429/56 |

FOREIGN PATENT DOCUMENTS

| EP | 0977290 | 2/2000 |
| JP | 11329402 | 11/1999 |

* cited by examiner

*Primary Examiner*—Carol Chaney
*Assistant Examiner*—Dah-Wei D. Yuan
(74) *Attorney, Agent, or Firm*—Perkins Coie LLP

(57) ABSTRACT

A sealed battery includes a can for receiving an electric generator, the can having an opened top end, a deformable plate air tightly mounted on the opened top with a gasket disposed between the deformable plate and an inner wall of the opened top end, a terminal cap disposed on the deformable plate, the terminal cap being elevated except for an edge, and a circuit breaker disposed between the deformable plate and the terminal cap to cut-off current flow when the deformable plate is deformed by internal pressure increased above an allowable level. The circuit breaker includes a insulating plate having a bridge disposed traversing above the deformable plate and provided with a mechanically weak portion and a via hole, the mechanically weak portion being severed when the deformable plate is deformed by internal pressure increased above a predetermined level, an upper conductive layer formed on an upper surface of the insulating plate, and a terminal member disposed through the via hole to electrically connect the upper conductive layer to the deformable plate.

21 Claims, 11 Drawing Sheets

SEALED BATTERY WITH INTERNAL PRESSURE ACTIVATED SAFETY MECHANISM

BACKGROUND OF THE INVENTION

1. Field of the Invention

The present invention relates to a secondary sealed battery in which safety features are obtained by reducing internal pressure and cutting-off current flow when the internal pressure of the battery is increased above an allowable level by an abnormal operation of the battery.

2. Description of the Related Art

Generally, a sealed battery has the drawback that it may explode when internal pressure is increased above an allowable level as a result of overcharging or the abnormal operation thereof.

U.S. Pat. No. 5,418,082 discloses a sealed battery with a circuit breaker that can prevent such battery explosions.

FIG. 11 shows a sealed battery disclosed in the U.S. Pat. No. 5,418,082.

A sealed battery comprises a can 2 in which an electric generator 4 is inserted together with electrolyte. A safety valve 6 is air-tightly mounted on an opened top of the can 2 with a gasket 8 disposed therebetween. A lead 12 is disposed on an upper surface of the safety valve 6. The safety valve 6 is provided with a projection 6a. The projection 6a is projected toward the electric generator 4.

Disposed between the safety valve 6 and the generator 4 is a disk 14 provided with a center hole 14a, into which the projection 6a is inserted, and a gas hole 14b. Disposed on a bottom surface of the disk 14 is a metal membrane 16 contacting a lead 18 of the electric generator 4. A disk holder 20 is disposed between the safety valve 6 and the disk 14.

For use as a circuit breaker 10, the projection 6a of the safety valve 6 and the metal membrane 16 are welded to each other. When internal pressure of the battery is increased above an allowable level, the safety valve 6 is deformed by the increased internal pressure such that the projection 6a of the safety valve 6 and the metal membrane 16 that are welded to each other are separated, thereby preventing the chance of explosion.

The severing force of the circuit breaker 10 is determined by the strength of the weld between the projection 6a and the metal membrane 16. However, since the weld strength is determined by a variety of parameters such as power, energy, amplitude, pressure of a welding apparatus, welding time, a welding gap, and material used in the welding process, it is difficult to maintain a uniform weld strength for each circuit breaker 10. As a result, the severing force of the circuit breaker 10 is varied for different circuit breakers 10.

In addition, it is possible for the weld between the safety valve 6 and the metal membrane 16 to oxidize by reacting with the electrolyte with the passage of time such that the strength of the weld force is reduced. Accordingly, the safety valve 6 and the metal membrane 16 welded to each other may be separated even when the internal pressure is not increased, causing the malfunction of the battery.

SUMMARY OF THE INVENTION

Therefore, the present invention has been made in an effort to solve the above described problems.

It is an objective of the present invention to provide a sealed battery having a circuit breaker which accurately operates at a predetermined internal pressure of the battery.

To achieve the above objective, the present invention provides a sealed battery comprising a can for receiving an electric generator, the can having an opened top end, a deformable plate air tightly mounted on the opened top end with a gasket disposed between the deformable plate and an inner wall of the opened top end, a terminal cap disposed on the deformable plate, the terminal cap being elevated except for an edge, and a circuit breaker disposed between the deformable plate and the terminal cap to cut-off current flow when the deformable plate is deformed by internal pressure increased above an allowable level, wherein the circuit breaker comprises an insulating plate having a bridge disposed traversing the deformable plate and provided with a mechanically weak portion and a via hole, the mechanically weak portion being severed when the deformable plate is deformed by internal pressure increased above a predetermined level, an upper conductive layer formed on an upper surface of the insulating plate, and a terminal member disposed through the via hole to electrically connect the upper conductive layer to the deformable plate.

The circuit breaker further comprises a lower conductive layer formed on a lower surface of the insulating plate, the terminal member being connected to the deformable plate through the lower conductive layer.

The upper conductive layer comprises a semi-bridge having a length less than that of the bridge such that the upper conductive layer has a first end located on one end of the bridge and a second end located on a portion of the bridge where the second end does not a contact the terminal cap.

Alternatively, the lower conductive layer comprises a semi-bridge having a length less than that of the bridge such that the lower conductive layer has a first end located on the other end of the bridge and a second end located on a portion of the bridge where the second end does not contact the terminal cap, the second end of the upper conductive layer being overlapped by the second end of the lower conductive layer.

Each of the upper and lower conductive layers and the insulating plate comprises a ring-shaped member.

The mechanically weak portion is defined by a hole formed on a middle portion.

The hole formed on the middle portion functions as the via hole. In addition, additional holes are formed on portions in the vicinity of opposite ends of the bridges to provide additional mechanically weak portions.

The upper and lower conductive layers are made of copper or solder.

The current breaker further comprises insulating layers respectively deposited on the upper and lower conductive layers except for a portion of the upper conductive layer which contacts the terminal cap, and a portion of the lower conductive layer which contacts the deformable plate. The insulating layer is deposited using insulating ink.

The deformable plate is provided with a safety groove which can be broken by a predetermined internal pressure of the battery. The predetermined internal pressure for breaking the safety groove is higher than the internal pressure for severing the mechanically weak portion.

A displacement of the deformable plate, which occurs by internal pressure increased above the predetermined allowable level, is set less than 1 mm.

The deformable plate is flat and comprises a reinforcing bead.

The sealed battery of the present invention may further comprise a current control member disposed between the circuit breaker and the terminal cap to cut-off current flow when a temperature of the battery is increased above an allowable level.

The current control member comprises upper and lower metal plates and a mixture layer disposed between the upper and lower metal plates, the mixture layer being made of carbon and polymer and the lower metal plate being integrally formed with the upper conductive layer of the circuit breaker.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Reference will now be made in detail to the present preferred embodiment of the invention, an example of which is illustrated in the accompanying drawing(s). Wherever possible, the same reference numbers will be used throughout the drawings to refer to the same or like parts.

Figure 1:
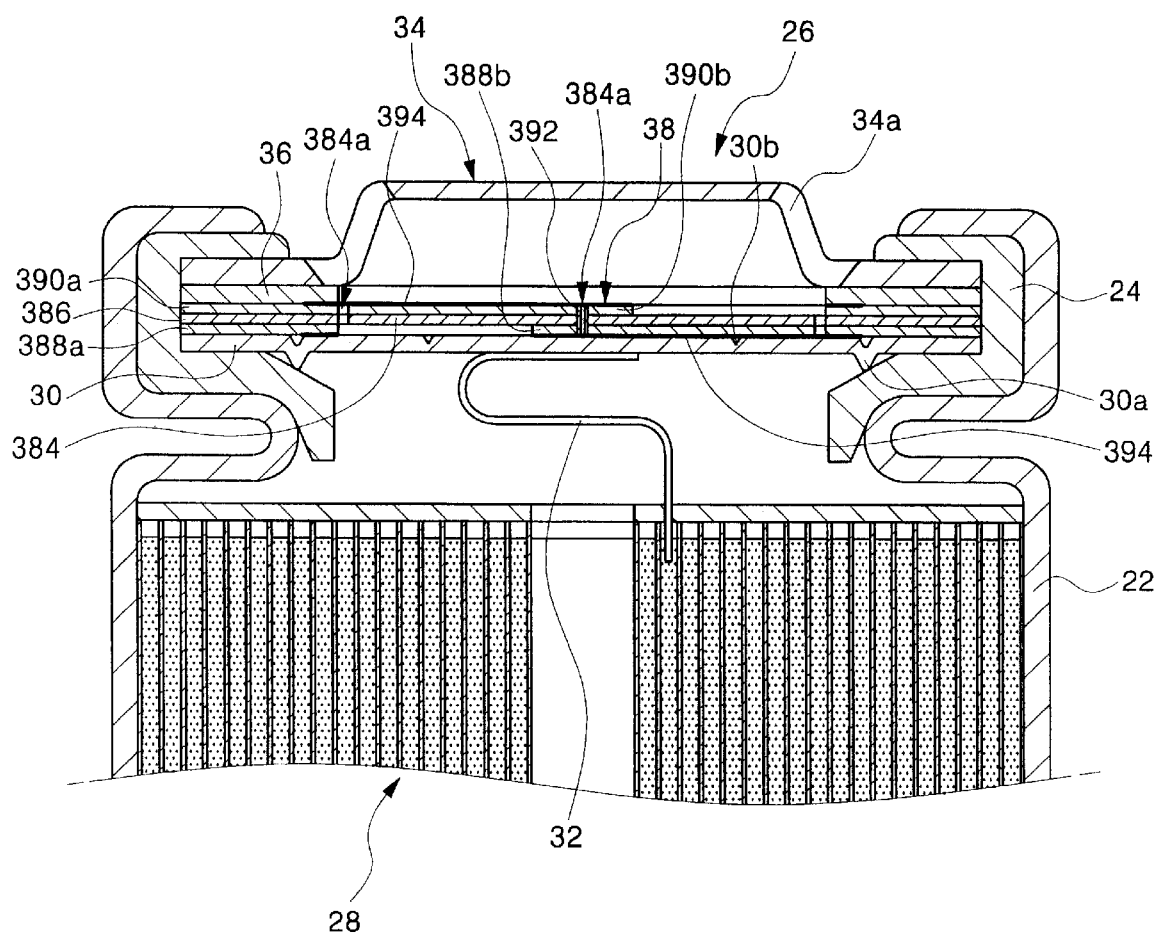
FIG. 1 is a sectional view of a sealed battery according to a first embodiment of the present invention.
Figure 2:
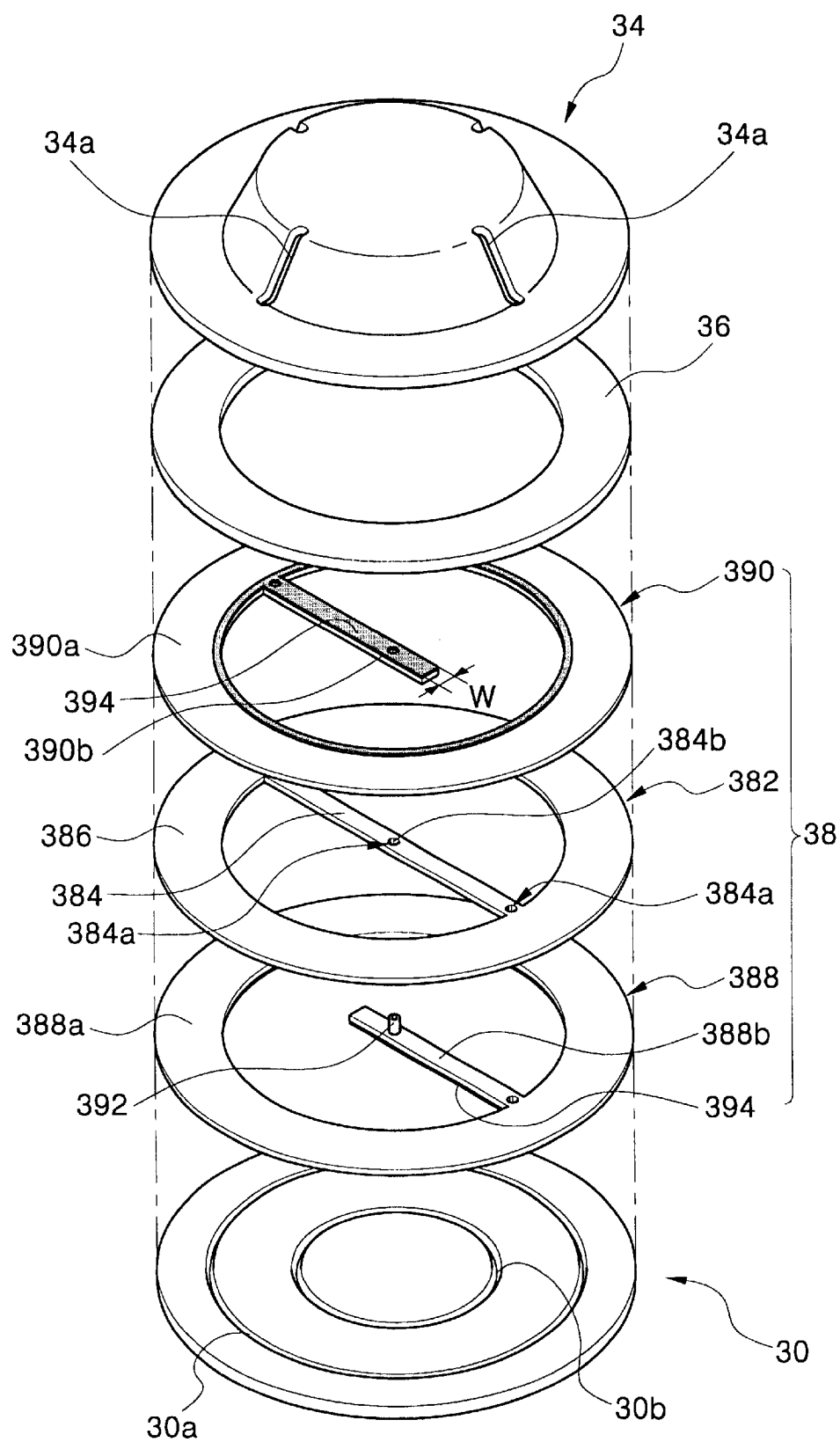
FIG. 2 is an exploded perspective view of a cap assembly depicted in FIG. 1.

FIGS. 1 and 2 show a sealed battery according to a first embodiment of the present invention.

A sealed battery comprises a cylindrical can 22 and a cap assembly 26 air-tightly mounted on an opened top end of the cylindrical can 22 with a gasket 24 disposed therebetween. An electric generator 28 comprising positive and negative electrodes and a separator disposed between the positive and negative electrodes is inserted into the cylindrical can 22 together with electrolyte.

The cap assembly 26 comprises a deformable plate 30 for sealing the opened top end with the gasket 24 disposed between the deformable plate 30 and an inner wall of the opened top end of the can 22. The deformable plate 30 is designed to be deformed in a direction where internal pressure of the battery is applied. The deformable plate 30 is provided with a circumferential reinforcing bead 30a to prevent the deformable plate 30 from being deformed during, for example, an assembling process.

The deformable plate 30 is electrically connected to the electric generator 28 by a tap 32. That is, the tap 32 is extended from one of the positive and negative electrodes of the electric generator 28, then welded on a bottom surface of the deformable plate 30. The other of the electrodes, which is not connected to the deformable plate 30, is electrically connected to the can 22.

Mounted on a top surface of the deformable plate 30 is a ring-shaped current control member 36 on which a terminal cap 34 provided with an air flow hole 34a is mounted. The current control member 36 is designed to cut-off the flow of current by quickly generating resistance when a temperature of the battery is increased above an allowable level. However, in this embodiment, the current control member 36 may be omitted. The description to follow will be presented assuming that the current control member 36 is omitted.

Disposed between the deformable plate 30 and the terminal cap 34 is a circuit breaker 38 which is designed to provide a current flow between the deformable plate 30 and the terminal cap 34 when the battery is normally operated, and to cut-off the flow of the current when internal pressure is increased above an allowable level by the abnormal operation of the battery.

Describing more in detail, the circuit breaker 38 comprises an insulating plate 382 disposed between the deformable plate 30 and the terminal cap 34. As with a conventional printed circuit board, the insulating plate 382 is made of epoxy resin. The insulating plate 382 comprises a ring-shaped member 386 and a bridge 384 disposed across a center of the ring-shaped member 386. When disposing the insulating plate 382 between the deformable plate 30 and the terminal cap 34, the bridge 384 is located to traverse a deformable center of the deformable plate 30. Although the insulating plate 382 is designed having the bridge 384 and the ring-shaped member 386, the ring-shaped member 386 is not an essential element. The bridge 384 is provided with mechanically weak portions 384a which can be easily severed or bent when the deformable plate 30 is deformed by excessive internal pressure of the battery.

The mechanically weak portions 384a are formed by forming holes on the bridge 384. Preferably, the holes are formed on a middle portion and opposite ends of the bridge 384. Alternatively, each of the mechanically weak portions 384a may be formed by a combination of holes and notches (see FIG. 3).

To provide an electrical circuit between the deformable plate 30 and the terminal cap 34, the insulating plate 382 is further provided at a bottom surface with a lower conductive layer 388 and at a top surface with an upper conductive layer 390, and a terminal member 392 is formed through in a via hole 384b to electrically interconnect the lower and upper conductive layers 388 and 390. The via hole 384b functions to define the center mechanically weak portion on the bridge 384.

The lower and upper conductive layers 388 and 390 and the terminal member 392 to are formed through an electroless plating process or a printing process using copper or solder.

The lower conductive layer 388 comprises a ring-shaped portion 388a corresponding to the ring shaped member 386 of the insulating plate 382 and a semi-bridge portion 388b, one end of which is integrally formed on a portion of an inner circumference of the ring-shaped portion 388a.

The upper conductive layer 390 comprises a ring-shaped portion 390a corresponding to the ring shaped member 386 of the insulating plate 382 and a semi-bridge portion 390b, one end of which is integrally formed on a portion of an inner circumference of the ring-shaped portion 390a.

Each of the semi-bridge portions 388b and 390b has a length shorter than the bridge 384 of the insulating plate 382 but longer than a length of half the bridge 384.

The upper conductive layer 390 is formed on the upper surface of the insulating plate 382 such that one end of the semi-bridge portion 390b, which is integrally formed with the inner circumference of the ring-shaped portion 390a, is correspondingly located on one end of the bridge 384, and the other end of the semi-bridge portion 390b is located on a portion over a middle portion of the bridge 384.

The lower conductive layer 388 is formed on the lower surface of the insulating plate 382 such that one end of the semi-bridge portion 388b, which is integrally formed with the inner circumference of the ring-shaped portion 388a, is correspondingly located on the other end of the bridge 384, and the.other end of the semi-bridge portion 388b is located on a portion over a middle portion of the bridge 384. Therefore, the semi-bridge portion 388b overlaps the semi-bridge portion 390b at the middle portion of the bridge 384.

Figure 4:
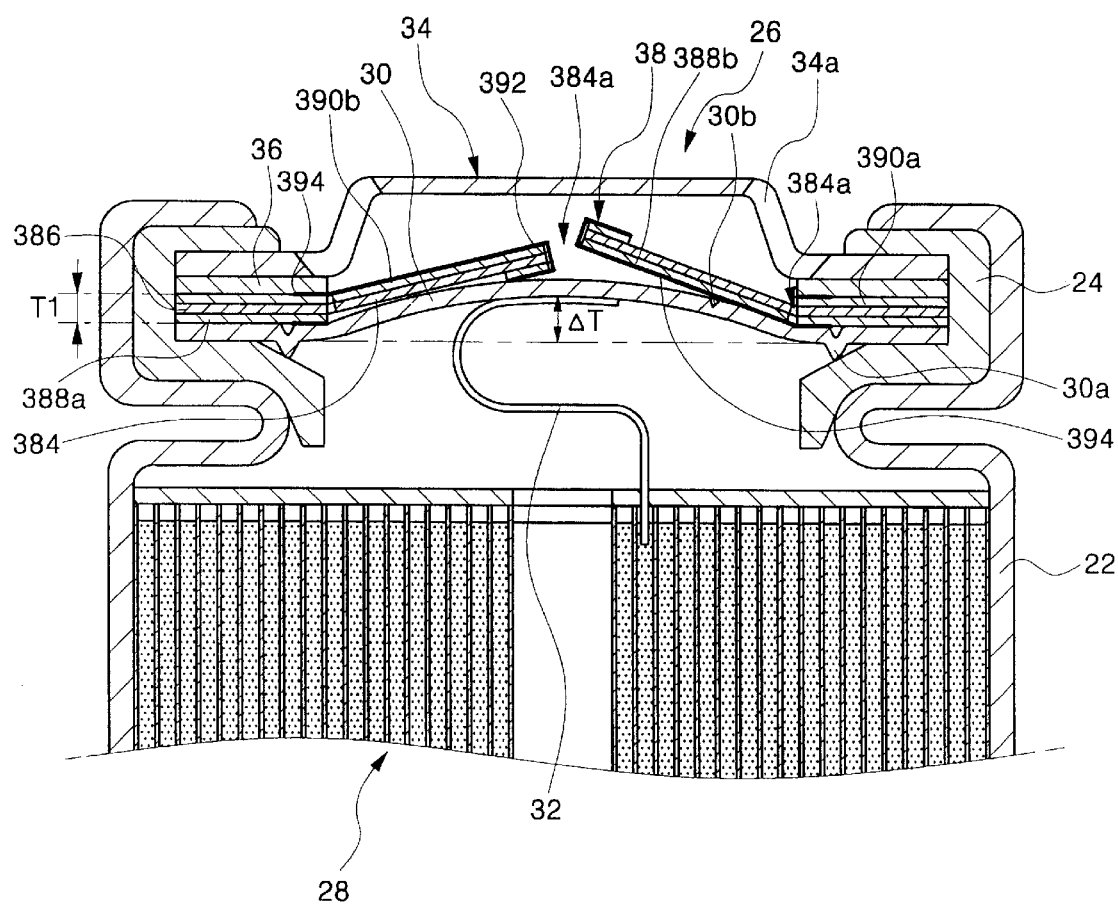
FIG. 4 is a sectional view illustrating an operation state of a circuit breaker depicted in FIG. 1.

To prevent the upper conductive layer 390 from contacting the terminal cap 34 when, as shown in FIG. 4, one of the mechanically weak portions 384a is broken by the deformation of the deformable plate 30 by the excessive internal pressure of the battery, the upper conductive layer 390 partially contacts the terminal cap 34 to form an electrical connection therebetween. For example, only an edge of the ring-shaped portion 390a of the upper conductive layer 390 contacts the terminal cap 34. To achieve this, an insulating layer 394 is deposited on the upper surface of the upper conductive layer 390 except for the edge of the ring-shaped portion 390a. The insulating layer 394 is also deposited on the lower surface of the lower conductive layer 388 in an identical manner. Preferably, the insulating layer is formed using insulating ink.

Figure 3:
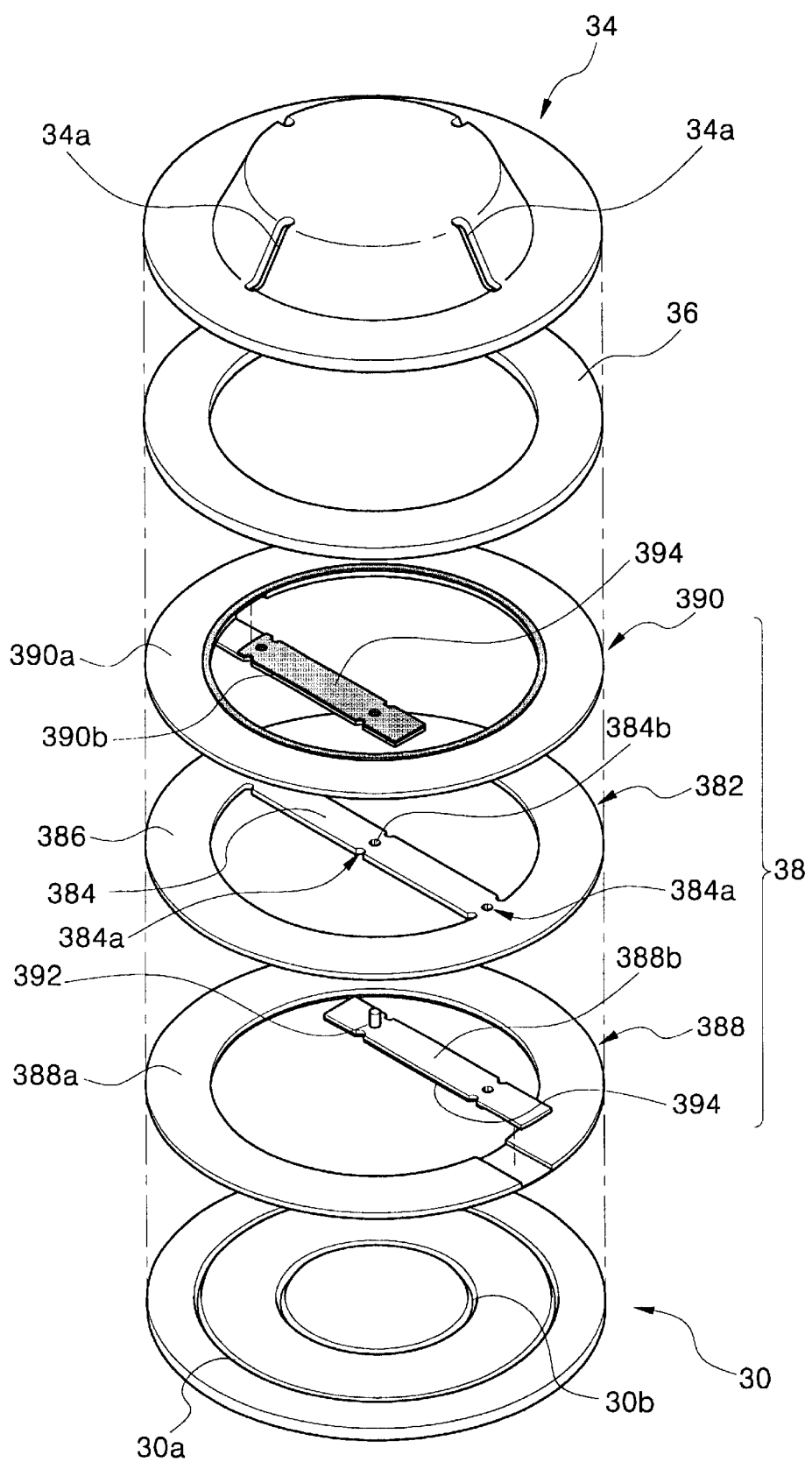
FIG. 3 is an exploded perspective view of a cap assembly according to a modified example of the present invention.

Although the semi-bridge portion and the ring-shaped portion are integrally formed in this embodiment, as shown in FIG. 3, the semi-bridge portion and the ring-shaped portion are separately made, then assembled to each other. In addition, as with the insulating plate 382, the ring-shaped portion of the conductive layer may be omitted.

Although it may be possible that the bridge 384 may be severed at its middle or opposite ends where the mechanically weak portions 384a are defined, the bridge 384 will be mostly severed at the middle portion as the deformable plate is deformed in a dome-shape as shown in FIG. 4, and will be simply bent at the opposite ends. The bending of the opposite ends of the bridge 384 will prevent the middle portion from being restored to its initial position or being electrically connected again after it is severed.

The sealed battery of the present invention may further comprise explosion-proof means for preventing the internal pressure of the battery from further increasing even after the circuit breaker 38 is operated, thereby preventing the battery from exploding.

Figure 5:
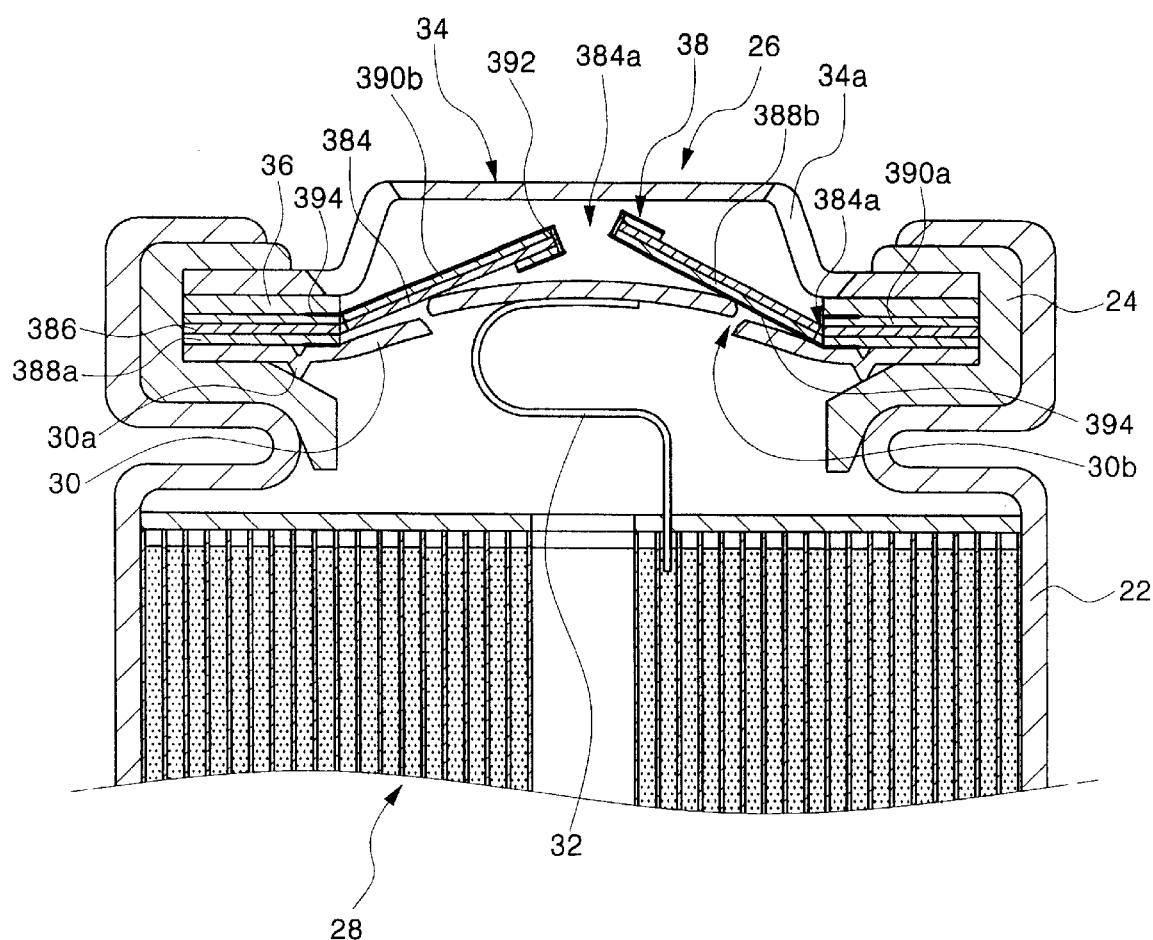
FIG. 5 is a sectional view illustrating an operation state of explosion-proof means depicted in FIG. 1.

That is, the deformable plate 30 is provided with a safety groove 30b. Therefore, as shown in FIG. 5, when the internal pressure of the battery is continuously increased even after the circuit breaker 38 is operated, the safety groove 30b is broken so that internal gas and electrolyte can be exhausted through the gas hole 34a formed on the terminal cap 34.

Figure 6:
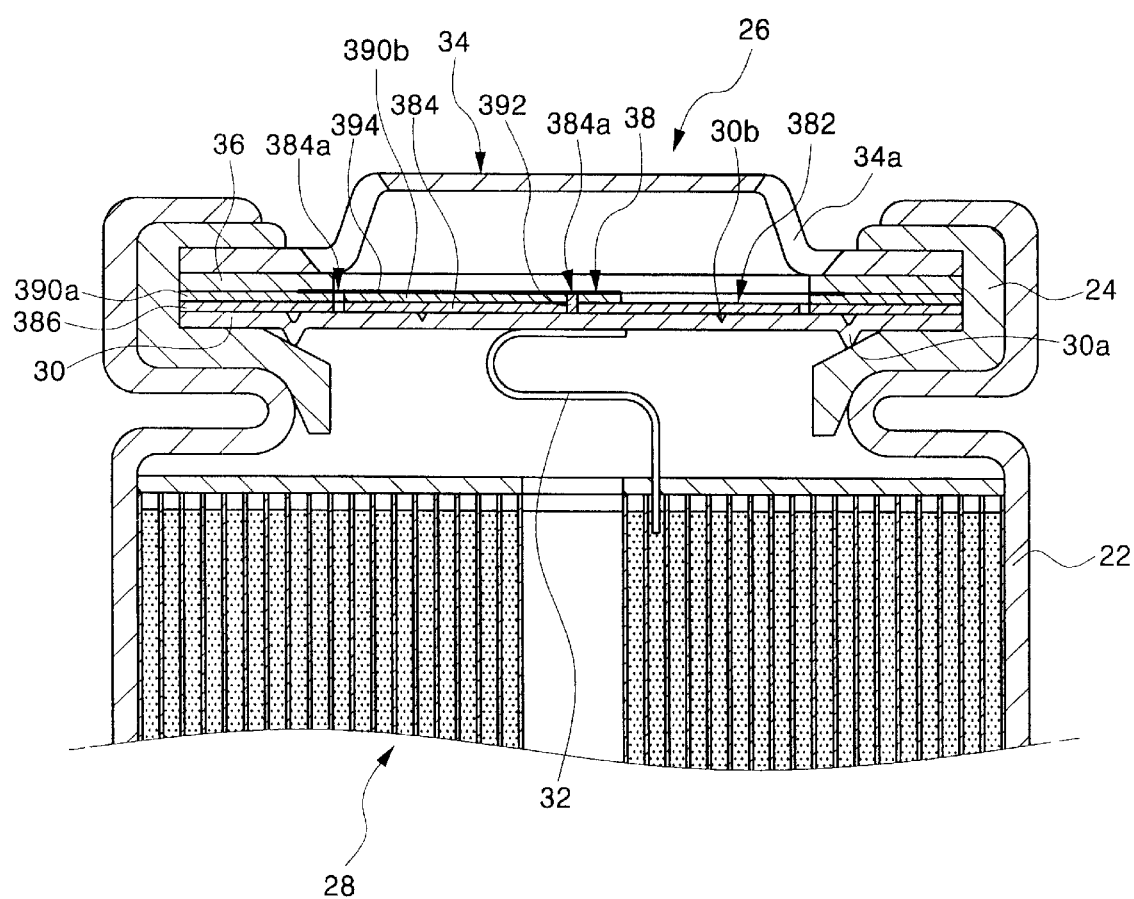
FIG. 6 is a sectional view of a sealed battery according to a second embodiment of the present invention.
Figure 7:
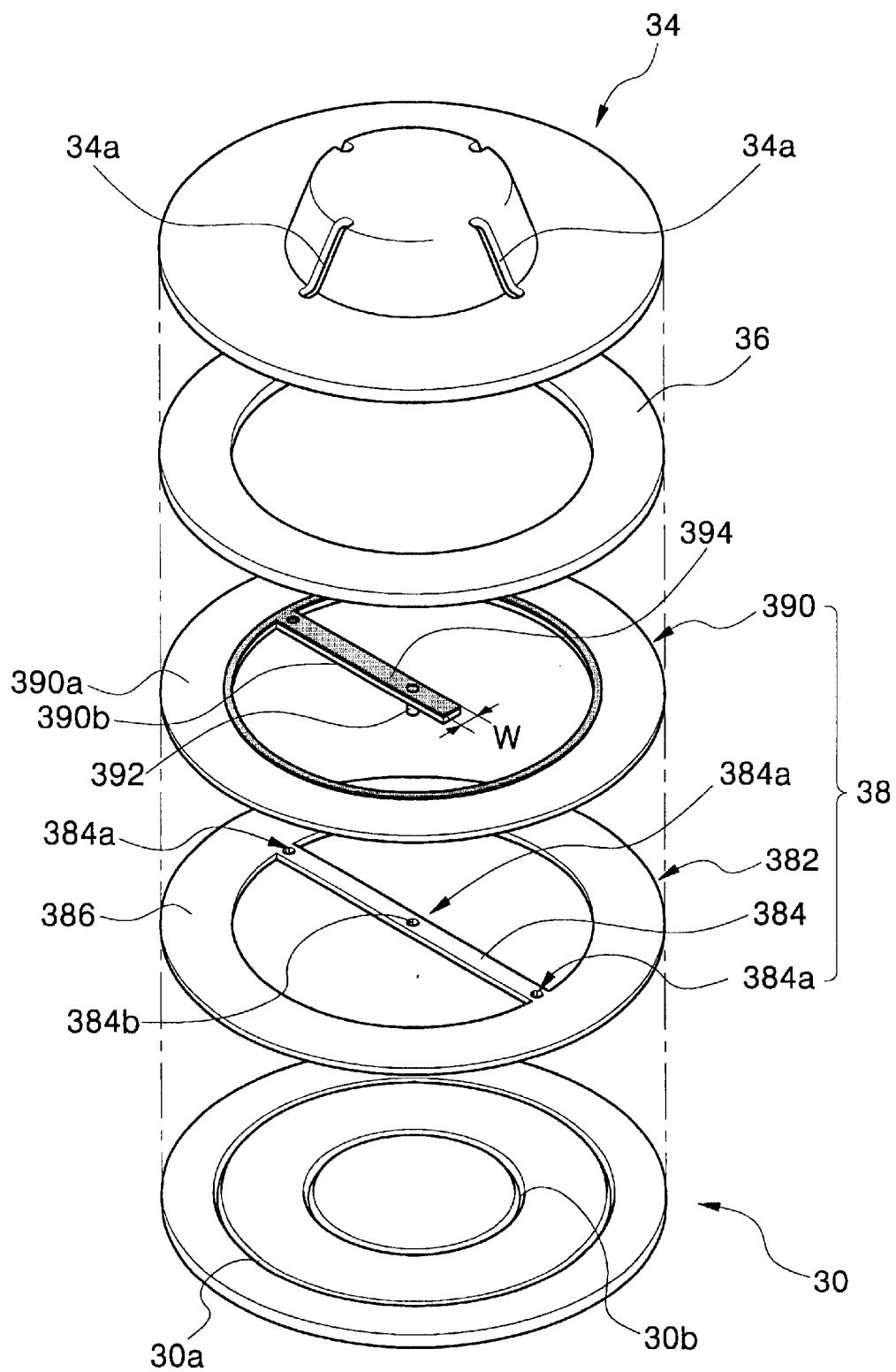
FIG. 7 is an exploded perspective view of a cap assembly depicted in FIG. 6.
Figure 8:
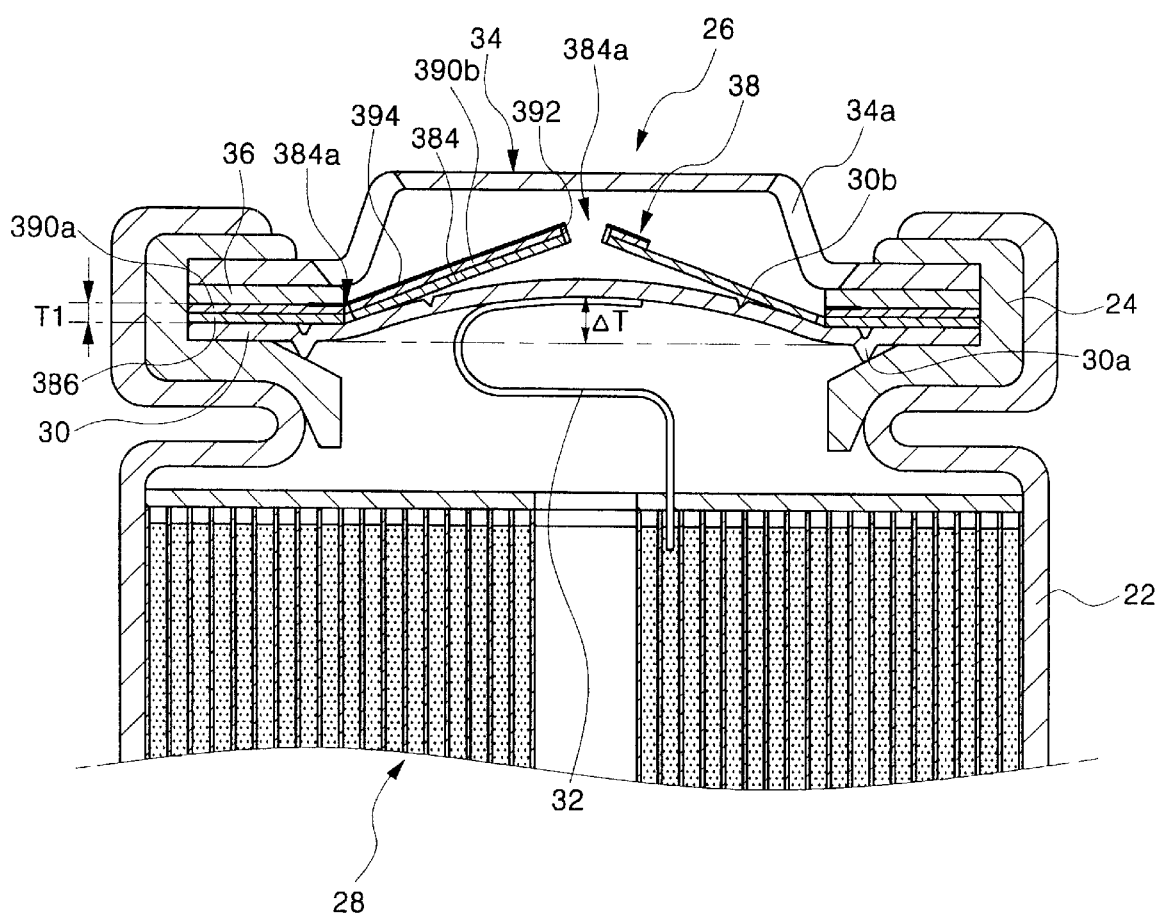
FIG. 8 is a sectional view illustrating an operation state of a sealed battery depicted in FIG. 6.

FIGS. 6 and 7 show a sealed battery according to a second embodiment of the present invention.

A sealed battery of this embodiment is identical to that of the first embodiment except that the lower conductive layer is omitted to simplify the structure of the cap assembly 26. With this configuration, the terminal member 392 directly contacts the deformable plate 30.

Figure 9:
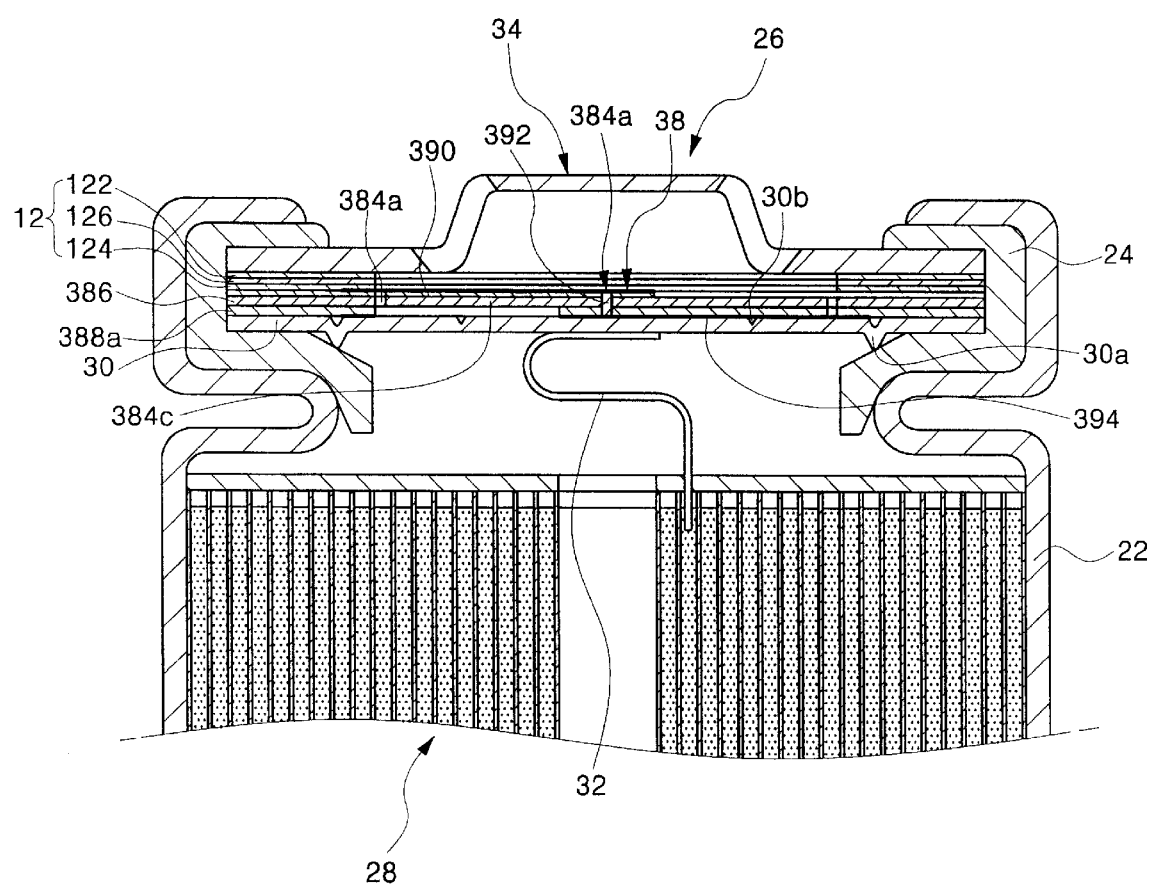
FIG. 9 is a sectional view of a sealed battery according to a third embodiment of the present invention.
Figure 10:
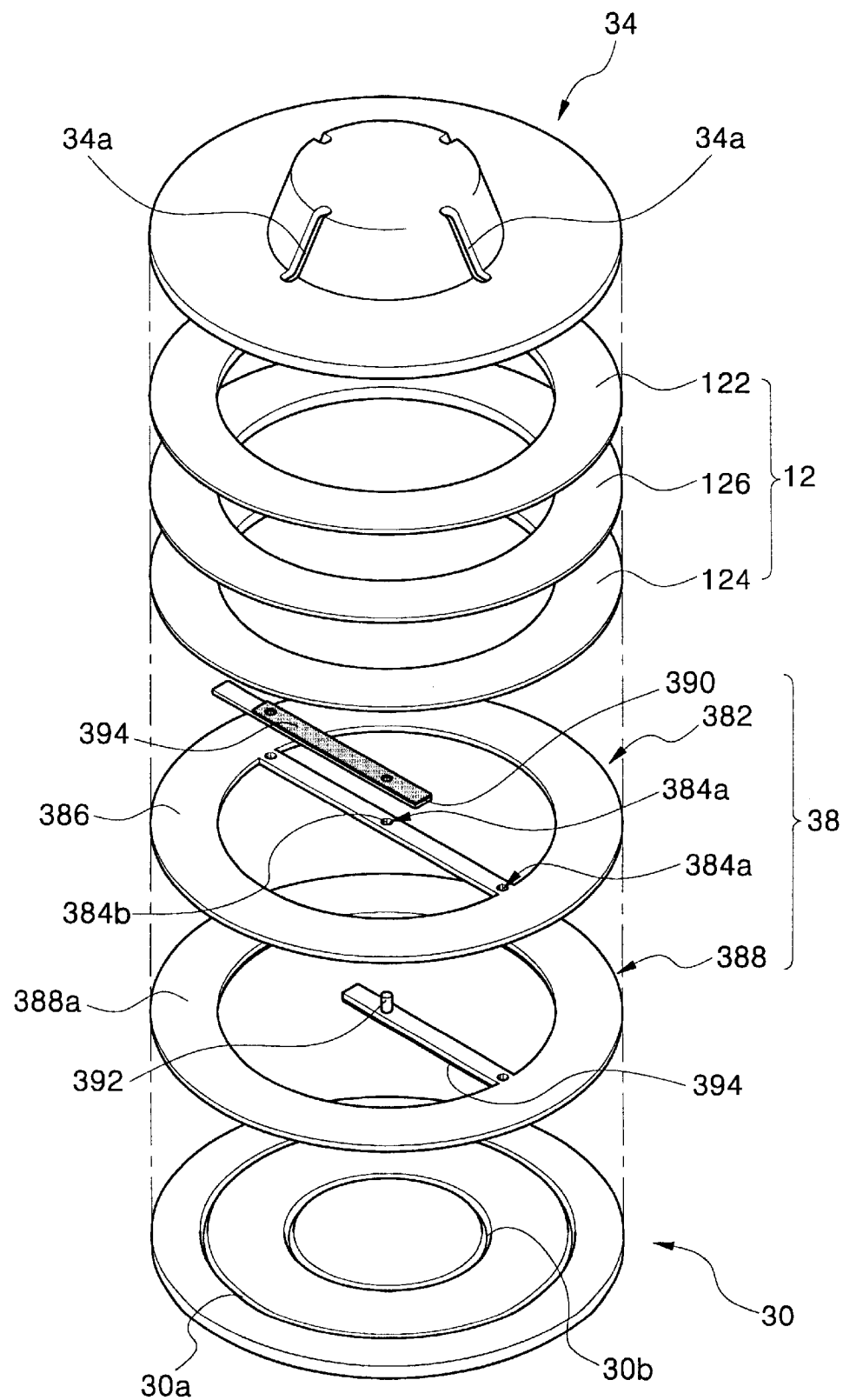
FIG. 10 is an exploded perspective view of a cap assembly depicted in FIG. 9.

FIGS. 9 and 10 show a sealed battery according to a third embodiment of the present invention.

In this embodiment, the current control member 36 should be essentially included, and the circuit breaker 38 is modified to simplify the structure thereof.

Describing more in detail, the current control member 36 of this embodiment comprises upper and lower ring-shaped metal plates 122 and 124, and a mixture layer 126 disposed between the upper and lower ring-shaped metal plates 122 and 14. The mixture layer 126 is made of a mixture composed of carbon and polymer, such that it has a conductive polymer chain and a thermally expandable polymer. Accordingly, when the thermally expandable polymer expands by an excessive temperature of the battery, the conductive polymer chain is temporarily disconnected so as to deteriorate the electric conductive power.

Here, the upper conductive layer 390 is comprised of only the bridge portion, one end of which contacts the lower metal plate 124. Therefore, the lower metal plate 124 functions as the ring-shaped portion of the upper conductive layer 390 which is described in the first embodiment.

In the above described embodiments, a displacement $\Delta T$ of the deformable plate 30, which occurs when the internal pressure is increased above an allowable level is preferably set to be less than 1 mm.

In addition, by making the deformable plate 30 flat, when the deformable plate 30 is deformed, the deformation pressure is applied to uniformly the circuit breaker 38 throughout a wide area.

In addition, a parameter of the operating pressure for the circuit breaker 38 comprises a thickness T1, a width W and a material of the bridge 384 and the conduction layers 390 and 388, and a diameter of holes defining the mechanically weak portions 384a. Therefore, although it seems that there are a variety of parameters, since the parameters are not manipulated until after the circuit breaker 38 is made, the operation pressure can be easily set if the circuit breaker 38 is made according to a predetermined specification.

Figure 11:
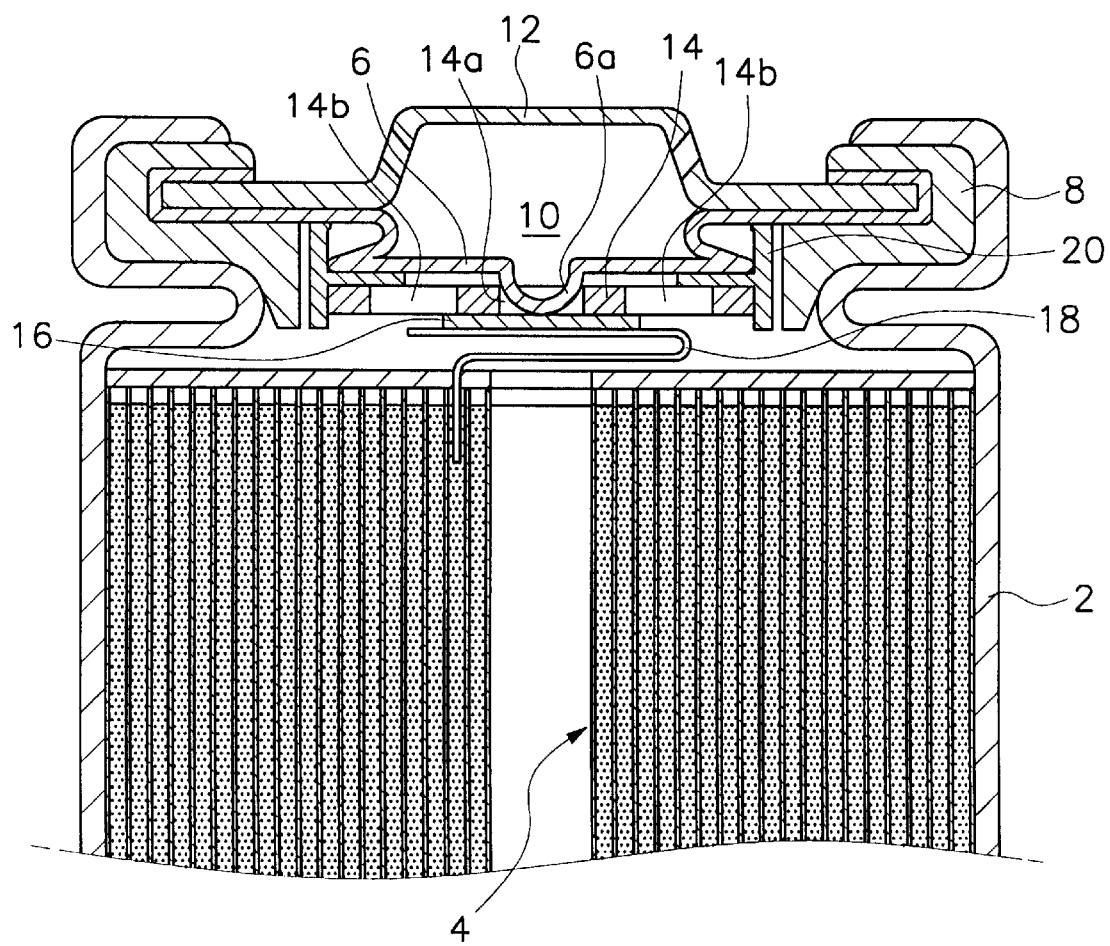
FIG. 11 is a sectional view of a conventional sealed battery.

A series of tests were conducted to compare operation pressures between circuit breakers of the present invention and the prior art. First, five samples S1 to S5 were manufactured using a technology of the present invention, then another five samples S6 to S10 were also manufactured using a technology described with reference to FIG. 11.

All of the samples S1 to S5 were made according to the following specifications: Thickness T1 of the mechanically weak portion: 0.4 mm Width W of the mechanically weak portion: 2 mm Diameter of the hole: 0.7 mm.

The test results are shown in the following table 1.

TABLE 1

|  | Present Invention (kgf/cm²) | | | | | Prior Art (kgf/cm²) | | | | |
| --- | --- | --- | --- | --- | --- | --- | --- | --- | --- | --- |
|  | S1 | S2 | S3 | S4 | S5 | S6 | S7 | S8 | 59 | S10 |
| Before 1 week | 11.10 | 12.30 | 12.20 | 12.40 | 13.10 | 11.2 | 13.8 | 10.4 | 15.3 | 17.4 |
| After 1 month | 11.10 | 12.30 | 12.20 | 12.40 | 13.10 | 11.0 | 13.5 | 10.2 | 15.0 | 17.1 |
| After 6 month | 11.05 | 12.25 | 12.16 | 12.30 | 13.05 | 10.5 | 12.8 | 9.7 | 14.6 | 16.4 |
| After 1 year | 11.05 | 12.24 | 12.14 | 12.30 | 13.04 | 10.0 | 12.3 | 9.2 | 14.0 | 15.5 |

As shown in the table 1, operating pressures of the samples made according to a conventional structure are within a range of 10.4~17.4 kgf/cm², having a relatively wide operating pressure dispersion.

However, operating pressures of the samples made according to the present invention are within a range of 11.10~13.10 kgf/cm², having a relatively narrow operating pressure dispersion. In addition, the operating pressures of the prior art samples are rapidly decreased with the passage of time, while the operating pressures of the present samples vary minimally even after one year.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A sealed battery comprising:
    a can for receiving an electric generator, the can having an opened top end;
    a deformable plate air tightly mounted on the opened top end with a gasket disposed between the deformable plate and an inner wall of the opened top end;
    a terminal cap disposed on top of the deformable plate, the terminal cap being elevated except for an edge; and
    a circuit breaker disposed between the deformable plate and the terminal cap to cut-off current flow when the deformable plate is deformed by internal pressure increased above an allowable level;
    wherein the circuit breaker comprises:
        an insulating plate having a bridge disposed traversing the deformable plate and provided with a mechanically weak portion and a via hole, the mechanically weak portion being severed when the deformable plate is deformed by internal pressure increased from a predetermined level;
        an upper conductive layer formed on an upper surface of the insulating surface;
        a terminal member disposed through the via hole to electrically connect the upper conductive layer to the deformable plate; and
        a lower conductive layer formed on a lower surface of the insulating plate, the terminal member being connected to the deformable plate through the lower conductive layer.

2. The sealed battery of claim 1 wherein the upper conductive layer comprises a semi-bridge structure, said semi-bridge structure having a length less than that of the bridge such that the upper conductive layer has a first end located on one end of the bridge and a second end located in between a middle portion of the bridge and the portion of the bridge which contacts the terminal cap.

3. The sealed battery of clam 1 wherein the upper conductive layer comprises a first semi-bridge structure, said first semi-bridge structure having a length less than that of the bridge such that the upper conductive layer has a first end located on one end of the bridge and a second end located on a portion of the bridge where the second end does not contact terminal cap, and the lower conductive layer comprises a second semi-bridge so said second semi-bridge structure having a length less an that of the bridge such that the lower conductive layer has a first end located on the other end of the bridge and a second end located on a portion of the bridge where the second end does not contact the terminal cap, wherein a portion of the upper conductive layer is overlapped by a portion of the lower conductive layer.

4. The sealed battery of claim 3 wherein each of the upper and lower conductive layers and the insulating plate comprises a ring-shaped member.

5. The sealed battery of claim 1 wherein the mechanically weak portion is defined by a hole formed on a middle portion.

6. The sealed battery of claim 5 wherein the hole formed on the middle portion functions as the via hole.

7. The sealed battery of claim 6 wherein holes are formed on portions in the vicinity of opposite ends of the bridges to provide additional mechanically weak portions.

8. The sealed battery of claim 2 wherein the upper and lower conductive layers are made of copper or solder.

9. The sealed battery of claim 1 wherein the current breaker further comprises insulating layers respectively deposited on the upper and lower conductive layers except for a portion of the upper conductive layer which contacts the terminal cap, and a portion of the lower conductive layer which contacts the deformable plate.

10. The sealed battery of claim 9 wherein the insulating layer is deposited using insulating ink.

11. The sealed battery of claim 1 wherein the deformable plate is provided with a safety groove which can be broken by a predetermined internal pressure of the battery.

12. The sealed battery of claim 11 wherein the predetermined internal pressure for breaking the safety groove is higher than the internal pressure for severing the mechanically weak portion.

13. The sealed battery of claim 1 wherein a displacement of the deformable plate, which occurs by internal pressure above the predetermined allowable level, is set less than 1 mm.

14. The sealed battery of claim 13 wherein the deformable plate comprises a reinforcing bead.

15. The sealed battery of claim 1 wherein the deformable plate is flat.

16. The sealed battery of claim 1 further comprising a current control member disposed between the circuit breaker and the terminal cap to cut-off current flow when a temperature of the battery is increased above an allowable level.

17. The sealed battery of claim 16 wherein the current control member comprises upper and lower metal plates and a mixture layer disposed between the upper and lower metal plates, the mixture layer being made of carbon and polymer and the lower metal plate being integrally formed with the upper conductive layer of the circuit breaker.

18. A sealed battery comprising:
- a can for receiving an electric generator, the can having an opened top end;
- a deformable plate air tightly mounted on the opened top end with a gasket disposed between the deformable plate and an inner wall of the opened top end, the deformable plate being electrically connected to either electrode of the electric generator;
- an insulating plate disposed over the deformable plate and provided with a mechanically weak portion served when the deformable plate is deformed by internal pressure increased above
- a predetermined allowable level so that current flow is cut off as the mechanically weak portion is severed; and
- a terminal cap disposed over the insulating plate, the terminal cap being electrically connected with the deformable plate.

19. The scaled battery of claim 18 wherein the insulating plate has a conductive layer formed on at least one of the top and bottom surfaces thereof.

20. The sealed battery of claim 18 wherein the insulating plate includes at least one via hole formed there through.

21. The waled battery of claim 18 wherein the mechanically weak portion has a width smaller than that of the other portion.

* * * * *